US009200660B2

(12) United States Patent
Tisol, Jr.

(10) Patent No.: US 9,200,660 B2
(45) Date of Patent: Dec. 1, 2015

(54) QUARTER TURN FASTENER

(71) Applicant: ILLINOIS TOOL WORKS INC., Glenview, IL (US)

(72) Inventor: James S. Tisol, Jr., Chippewa Falls, WI (US)

(73) Assignee: Illinois Tool Works, Inc., Glenview, IL (US)

(*) Notice: Subject to any disclaimer, the term of this patent is extended or adjusted under 35 U.S.C. 154(b) by 0 days.

(21) Appl. No.: 14/395,077

(22) PCT Filed: Apr. 30, 2013

(86) PCT No.: PCT/US2013/038758
§ 371 (c)(1),
(2) Date: Oct. 17, 2014

(87) PCT Pub. No.: WO2013/165948
PCT Pub. Date: Nov. 7, 2013

(65) Prior Publication Data
US 2015/0089778 A1  Apr. 2, 2015

Related U.S. Application Data

(60) Provisional application No. 61/641,038, filed on May 1, 2012.

(51) Int. Cl.
*F16B 21/02* (2006.01)
*F16B 21/08* (2006.01)

(52) U.S. Cl.
CPC .............. *F16B 21/02* (2013.01); *F16B 21/086* (2013.01); *Y10T 24/309* (2015.01); *Y10T 24/42* (2015.01); *Y10T 24/44026* (2015.01); *Y10T 24/4578* (2015.01)

(58) Field of Classification Search
CPC .......... F16B 21/02; F16B 21/086; F16B 5/10; F16B 19/008; Y10S 411/943; Y10S 403/14; Y10S 411/913; B60R 13/0206; Y10T 24/304; Y10T 24/309; Y10T 24/4578; Y10T 403/16; Y10T 403/5793; Y10T 403/7005
USPC .............. 24/293, 297, 663; 411/544, 549, 552
See application file for complete search history.

(56) References Cited

U.S. PATENT DOCUMENTS 2,555,291 A   5/1951  Poupitch
4,762,437 A   8/1988  Mitomi
(Continued)

FOREIGN PATENT DOCUMENTS

DE  102006020697 B3   4/2007
FR       2911647 A1   7/2008
(Continued)

OTHER PUBLICATIONS

ISR and WO for PCT/US2013/038758 mailed Aug. 14, 2013.

*Primary Examiner* — Robert J Sandy
*Assistant Examiner* — David Upchurch

(57) ABSTRACT

A quarter turn fastener includes a deflectable head and part in assembly legs for securing the fastener in a subassembly with one component positioned between the deflectable head and the part in assembly legs. Cooperating lock arms on the fastener and lock ribs on the component secure the fastener against unintended rotation for loosening. Stop ribs on the component limit the distance the fastener can be rotated. Main body legs are provided for securing a second component with the subassembly. Cooperating structures of the fastener and the components limit the fastener to rotate only in the lock direction from the unlocked position and in the unlock direction from the locked position.

18 Claims, 7 Drawing Sheets

(56) References Cited

U.S. PATENT DOCUMENTS

| | | | |
|---|---|---|---|
| 6,237,970 B1* | 5/2001 | Joannou | 292/241 |
| 7,955,038 B2 | 6/2011 | Silbereisen et al. | |
| 2003/0059255 A1* | 3/2003 | Kirchen | 403/353 |
| 2004/0170491 A1* | 9/2004 | Hulin et al. | 411/553 |
| 2006/0000064 A1* | 1/2006 | Leverger et al. | 24/297 |
| 2012/0073089 A1 | 3/2012 | Buillas | |
| 2015/0089778 A1* | 4/2015 | Tisol, Jr. | 24/663 |

FOREIGN PATENT DOCUMENTS

| | | |
|---|---|---|
| JP | S4924873 U | 3/1974 |
| JP | S5637210 U | 4/1981 |
| JP | S59170308 U | 11/1984 |
| JP | H01139111 U | 9/1989 |
| WO | 2010121745 A1 | 10/2010 |
| WO | 2010138562 A1 | 12/2010 |
| WO | 2012023448 A1 | 2/2012 |

* cited by examiner

QUARTER TURN FASTENER

CROSS-REFERENCE TO RELATED APPLICATIONS

The present application is a National Phase of International Application Number PCT/US2013/038758 filed Apr. 30, 2013 and claims the benefits of U.S. Provisional Application Ser. No. 61/641,038 filed May 1, 2012.

FIELD OF THE INVENTION

The present invention relates generally to fasteners, and more particularly, to one-piece fasteners that can be pre-installed by hand in one component of an assembly and thereafter hand manipulated to complete a connection to another component of the assembly.

BACKGROUND OF THE INVENTION

The automotive industry is increasing the use of underbody shielding on vehicles for many reasons, including for improving the aerodynamic performance of the vehicle, providing added protection of exposed components of the vehicle, improving noise performance, and other reasons. One or several shield panels are fastened in place as an outer surface or cover over the irregular surfaces provided by exposed individual components. On some vehicles, only selected components are provided with shielding, and on other vehicles a substantial portion of the underbody is shielded; however, the general tendency is toward the use of more complete shielding of the underbody.

To fasten the panels of underbody shielding in place, it is known to use costly multiple component assembly methods, including the use of fasteners such as nuts and bolts. These attachment methods have achieved only moderate acceptance due to cost and assembly inefficiencies. Using standard fasteners such as nuts and bolts is costly both for manufacturing of the fastener, and for the subsequent installation and use of the fastener when securing the underbody shielding in place. Connecting multi-component fasteners with tools can be time consuming and difficult. Handling the individual pieces can be slow and prone to mishandling and subsequent delay when retrieving the mishandled part or acquiring a replacement part. Since the underbody shielding may have to be removed for servicing and repairing the vehicle, the time required to disconnect the fasteners to remove the shielding and to then reconnect the fasteners to reinstall the shielding is an important consideration not only for initial vehicle assembly, but throughout the life of the vehicle. Multi-component fasteners can be mishandled or lost during disassembly and reassembly while servicing or repairing the automobile, Simple, one-piece fasteners provide advantages when used for attaching underbody shielding on automobiles, and can have use in other applications in the automotive industry, as well as in other industries for other uses and purposes.

SUMMARY OF THE INVENTION

The quarter turn fastener disclosed herein simplifies the assembly method of automobiles and other assemblies by eliminating the need for any hand tools to connect the fasteners, and by eliminating the inconveniences of multiple component fastener assemblies. A simple one-piece, quarter turn fastener is all that is required to fasten each joint of the components.

In one aspect of a form thereof, a fastener for securing first and second components to one another in an assembly is provided with a main head, a turn tab projecting from the head and configured for manual manipulation when turning the fastener, and a pedestal projecting from a surface of the main head opposite from of the turn tab. A first deflectable leg projects from the pedestal and has a ledge defining a first distance from the main head. A first main body leg projects from the pedestal and has an upper surface defining a second distance from the main head, the second distance being greater than the first distance.

In another aspect of a form there of, a fastener subassembly is provided with a fastener having a main head, a turn tab projecting outwardly from a surface of the main head and configured for manual manipulation when turning the fastener, and a pedestal projecting from a surface of the head opposite from of the turn tab. A first deflectable leg projects from the pedestal and has a ledge defining a first distance from the main head. A flexible head at a proximal end of the pedestal is positioned between the main head and the ledge. A first main body leg projects from the pedestal and has an upper surface defining a second distance from the head, the second distance being greater than the first distance. An assembly component defines an assembly component hole extending from an outer surface thereof to an other surface thereof. The pedestal extends through the hole, with the deflectable head engaging the outer surface adjacent the hole, and the ledge engaging the other surface adjacent the hole.

Other features and advantages of the invention will become apparent to those skilled in the art upon review of the following detailed description, claims and drawings in which like numerals are used to designate like features.

Figure 1:
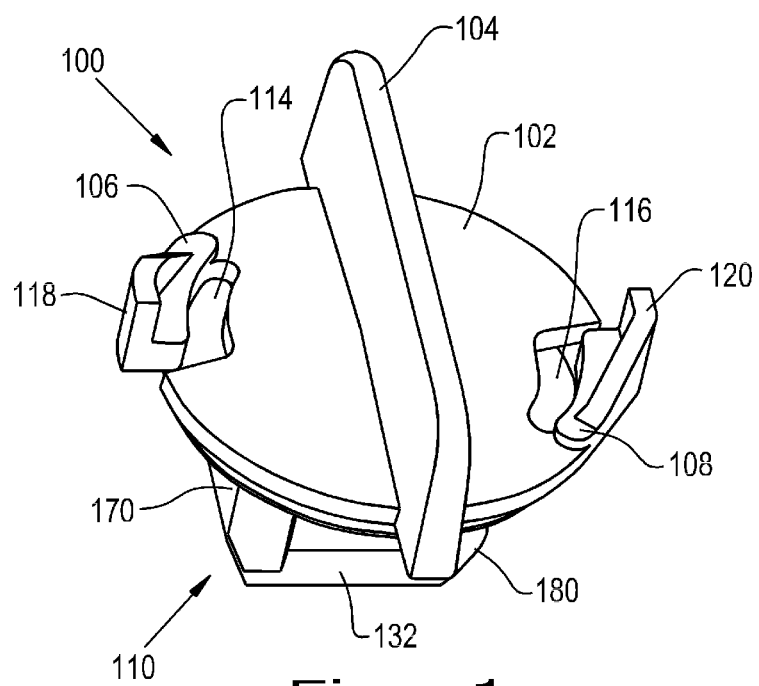
FIG. 1 is a perspective view of a quarter turn fastener.
Figure 2:
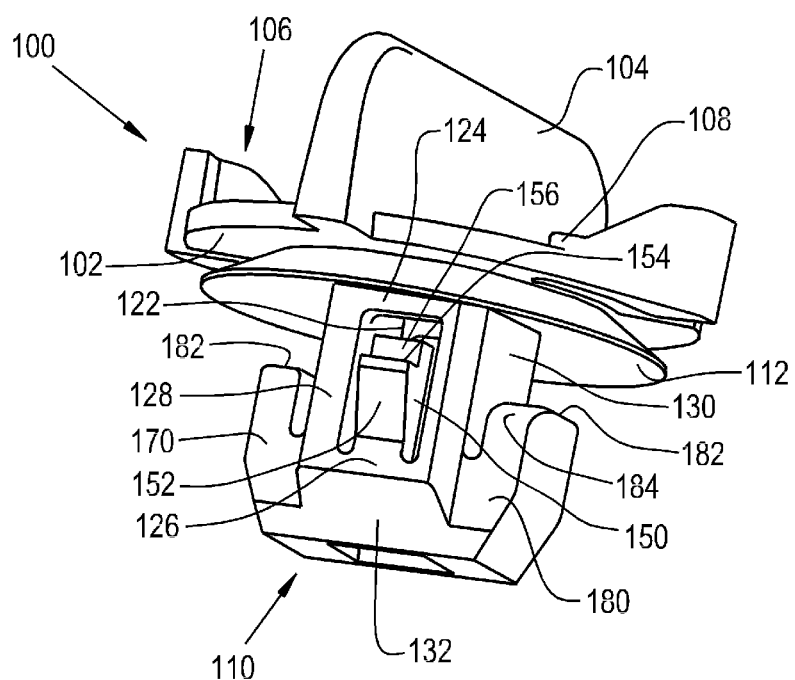
FIG. 2 is a perspective view of the quarter turn fastener shown from an angle different from the angle of the perspective view in FIG. 1.
Figure 3:
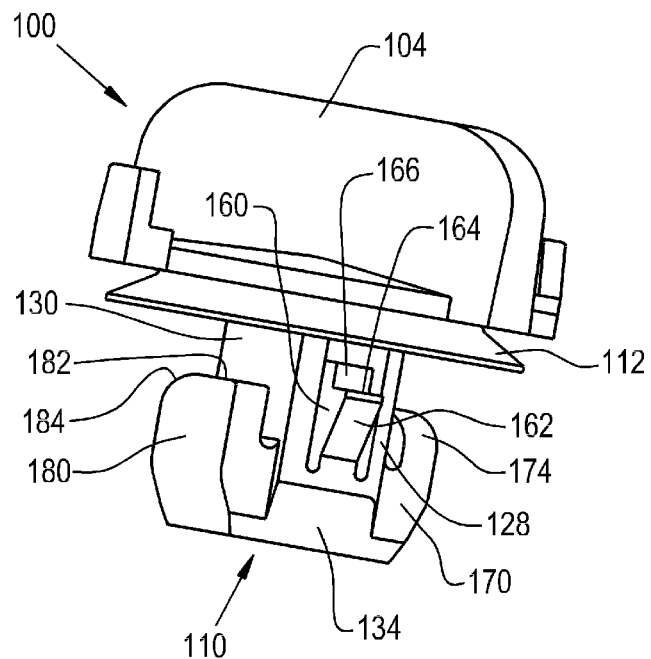
FIG. 3 is a perspective view of the quarter turn fastener shown from yet another angle.
Figure 4:
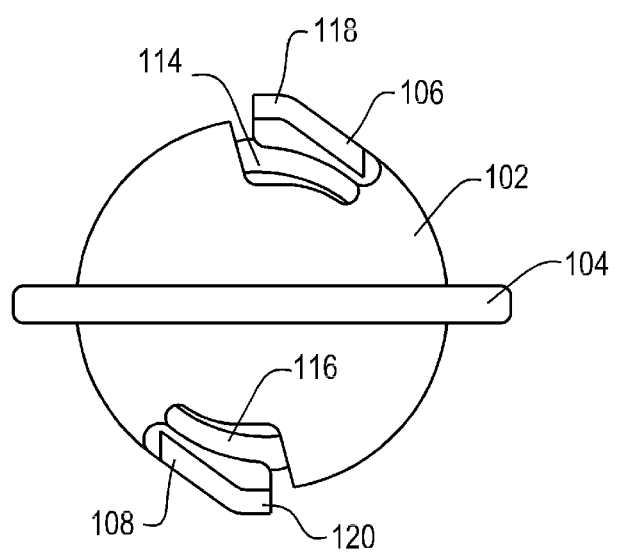
FIG. 4 is a top view of the quarter turn fastener.
Figure 5:
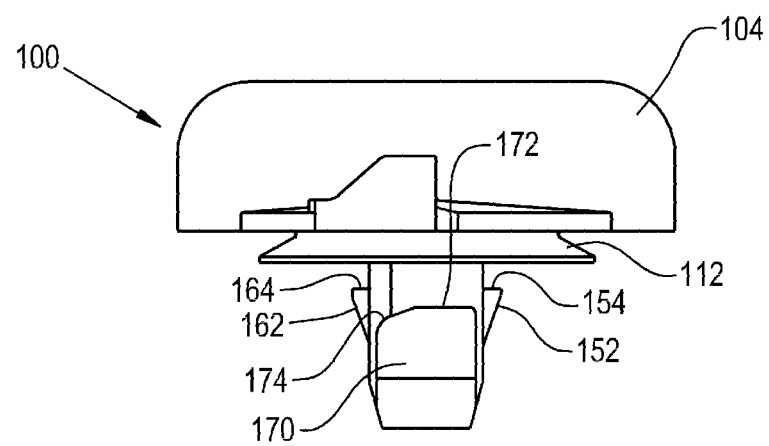
FIG. 5 is an elevational view of the quarter turn fastener.
Figure 6:
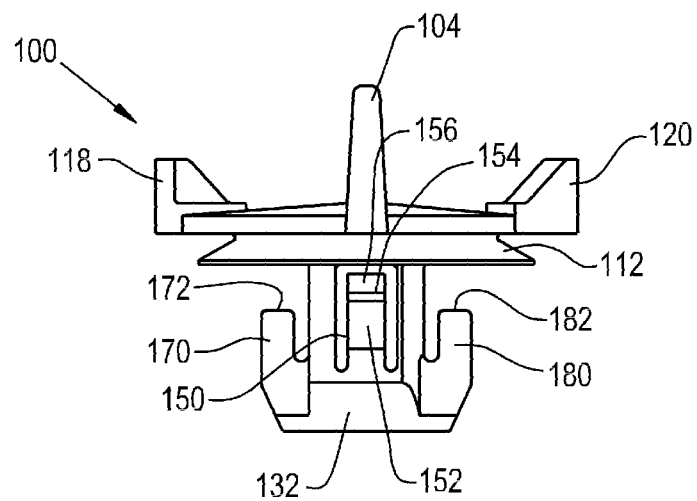
FIG. 6 is a an elevational view of the quarter turn fastener illustrating the fastener rotated about 90° from the position shown in FIG. 5.
Figure 7:
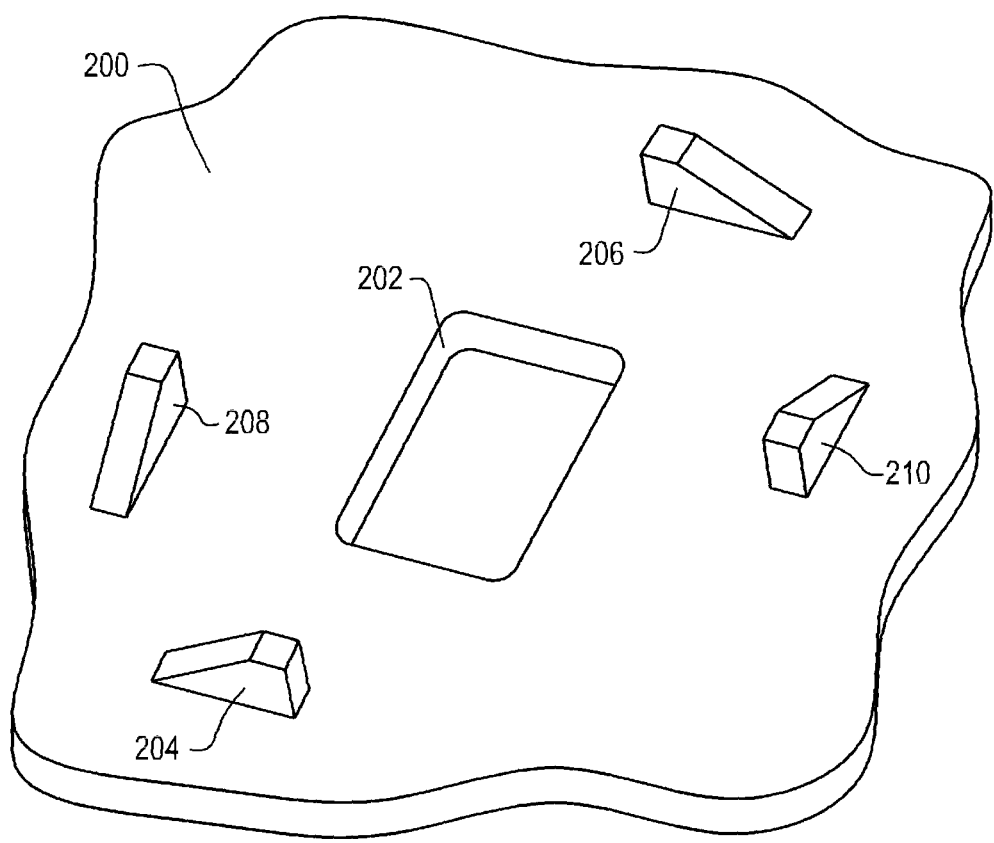
FIG. 7 is a fragmentary perspective view of an assembly component to be secured in an assembly using the quarter turn fastener.
Figure 8:
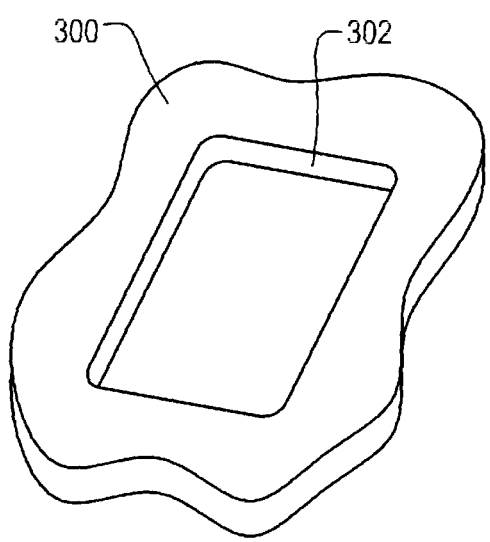
FIG. 8 is a fragmentary perspective view of another assembly component to be secured in an assembly using the quarter turn fastener.
Figure 9:
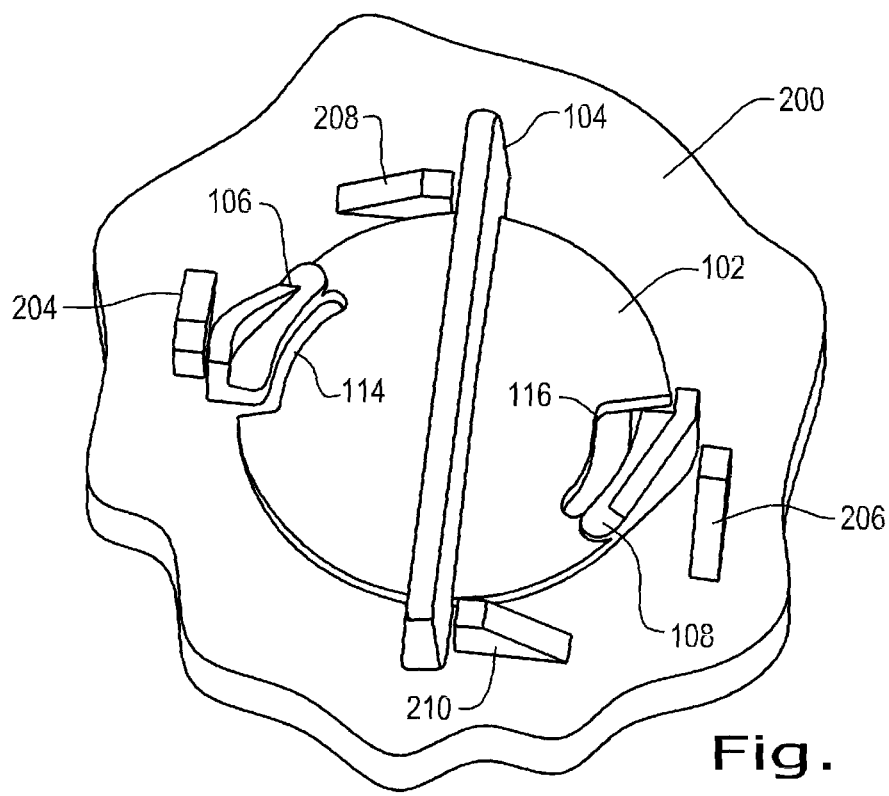
FIG. 9 is a fragmentary perspective view of the quarter turn fastener installed in, as a subassembly with the assembly component shown in FIG. 7.
Figure 10:
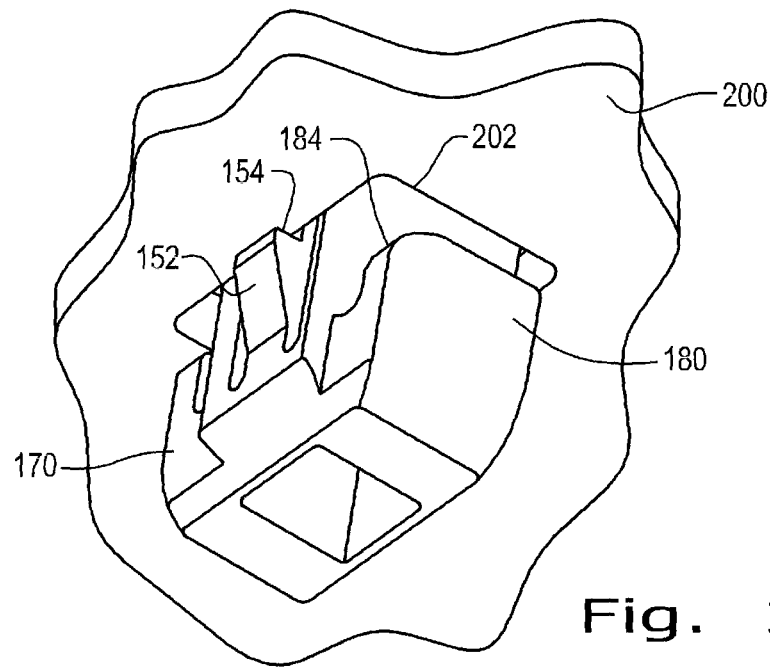
FIG. 10 is a fragmentary perspective view of the subassembly shown in FIG. 9, but illustrating the subassembly from the side of the assembly component opposite the side shown in FIG. 9.
Figure 11:
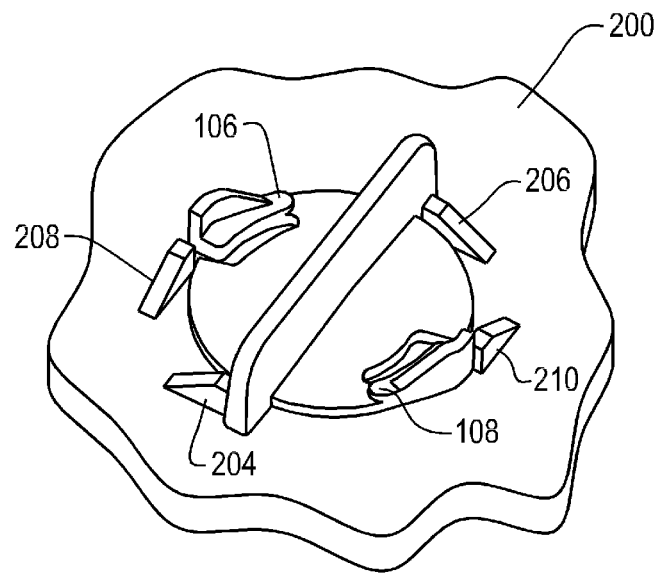
FIG. 11 is a fragmentary perspective view of the final assembly of the quarter turn fastener and the two assembly components shown in FIGS. 7 and 8.
Figure 12:
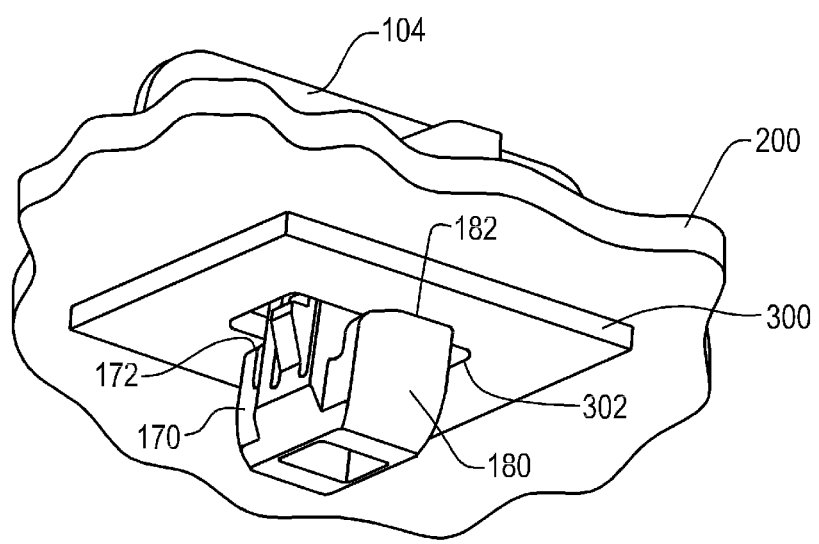
FIG. 12 is a fragmentary perspective view of the final assembly shown in FIG. 11, but illustrating the assembly from the side opposite the side shown in FIG. 11.
Figure 13:
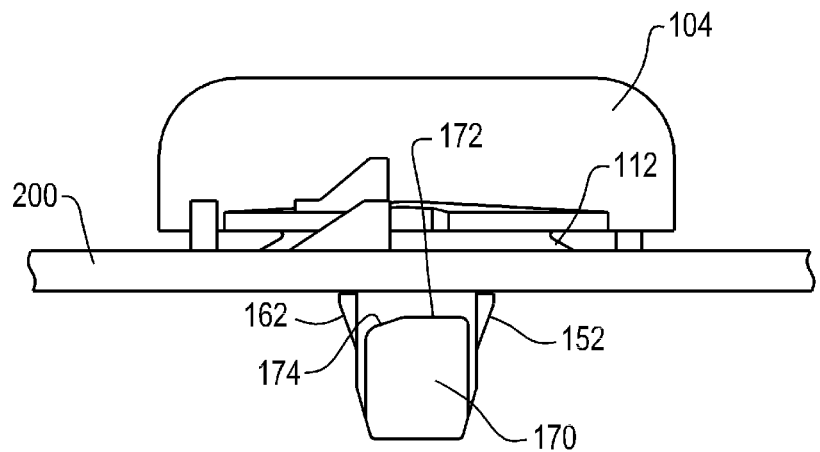
FIG. 13 is a side elevational view of the subassembly shown in FIGS. 9 and 10.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more particularly to the drawings, a quarter turn fastener 100 is shown. Quarter turn fastener 100 is useful in an assembly for connecting a secondary assembly component 200, such as underbody shielding for an automobile, to a primary assembly component 300 of the assembly. The quarter turn fastener 100 can be preinstalled in the secondary assembly component 200 for subsequent placement on and connection to the primary component 300. Quarter turn fastener 100 can be made of synthetic materials, such as injection molded plastics. Secondary assembly component 200 and primary assembly component 300 can be made of various materials, including metals and plastics.

Quarter turn fastener 100 includes a main head 102 having a diametrically positioned, axially outwardly projecting turn tab 104. Turn tab 104 is of sufficient size and shape for convenient and comfortable manipulation between a thumb and fingers of an installer, and is of sufficient strength and rigidity to use for positioning and rotating fastener 100 during installation of the fastener in at least one component, initial attachment of the components in an assembly, detachment of the components if and when disassembly is required, and the subsequent reassembly of the disassembled components. While the quarter turn fastener described herein is suitable and intended for manual manipulation, it should be understood that tools of various types also may be used when turning the fastener, if so desired.

Head 102 is a generally plate-like structure having turn tab 104 projecting outwardly therefrom. Turn tab 104 projects beyond the peripheral edge of head 102 to define a length greater than the diameter of head 102 in areas near turn tab 104. At the periphery of main head 102, one or more lock arm 106, 108 is provided; two such lock arms 106, 108 being shown in the drawings of the exemplary quarter turn fastener 100, one such luck arm 106 on one side of turn tab 104 and the other such lock arm 108 on the opposite side of turn tab 104. Beneath head 102, a central, generally rectangular shaped pedestal 110 includes part in assembly (PIA) legs 150, 160 and main body legs 170, 180. An umbrella-like overdrive flexible head 112 is provided immediately below main head 102, at the top of pedestal 110 to provide a resilient, biasing and somewhat cushioning interface for quarter turn fastener 100 within an assembly as will be described subsequently herein.

Lock arms 106, 108 are each connected at the proximal ends thereof to head 102 and curve outwardly from head 102 to define together with head 102 deflection spaces 114, 116 into which the distal ends and lengths of lock arms 106, 108 can be deflected. Each lock arm 106, 108 has an enlarged, blunt distal end body 118, 120, respectively. Distal end bodies 118, 120 have sufficient upwardly extending heights for manipulating if and when it is necessary to disconnect quarter turn fastener 100 from an assembly, as will be described subsequently herein. Accordingly, distal end bodies 118, 120 project higher than the upper surface of head 102; and lock arms 106, 108 angle downwardly from the distal end bodies 118, 120 toward the connected proximal ends of lock arms 106, 108. Radius lengths defined to the distal ends of lock arms 106, 108 are greater than the radius of head 102 in other areas.

Pedestal 110 is a generally rectangular body defining a window 122 between a top 124, a bottom 126 and opposed sides 128, 130. Part in assembly leg 150 is positioned at window 122 on one side of pedestal 110 and part in assembly leg 160 is positioned at window 122 on the opposite side of pedestal 110, part in assembly legs 150, 160 being connected to pedestal 110 at bottom 126 thereof and extending upwardly from bottom 126 toward top 124. Part in assembly legs 150, 164 can deflect inwardly simultaneously into window 122. Bottom 126 includes angled bottom surfaces 132, 134 on opposite sides thereof, generally beneath part in assembly legs 150, 160. Sides 128, 130 each include a radius edge 136, 138 and a non-radius, generally right angle, anti-rotation edge 140, 142.

Part in assembly legs 150, 160 have outwardly angled sides 152, 162, respectively, extending upwardly and outwardly from pedestal bottom 126. Part in assembly legs 150, 160 define ledges 154, 164 above the angled sides 152, 162, respectively. At the inner edges of ledges 154, 164 upwardly extending stop surfaces 156, 166 are provided. Ledges 154, 164 are disposed a first distance from main head 102 suitable for receiving secondary assembly component 200 between head 102 and ledges 154, 164.

Main body legs 170, 180 extend generally outwardly and upwardly from bottom 126 of pedestal 110, generally outside of sides 128, 130 of pedestal 110, thus further accentuating the overall rectangular configuration of quarter turn fastener 100 beneath head 102. Main body legs 170, 180 have generally flat upper surfaces 172, 182, respectively, disposed a second distance from main head 102 that is greater than the first distance defined between main head 102 and ledges 154, 164. Progressive surfaces such as rounded or angular edges 174, 184 are provided at the lead-in to flat upper surfaces 172, 182 with respect to the direction of rotation for fastening.

In an assembly using quarter turn fastener 100, secondary assembly component 200 is provided with an appropriately sized secondary assembly component hole 202, generally rectangular in shape only slightly larger than the rectangular shape defined by pedestal 110 and main body legs 170, 180 so as to receive fastener 100 only in a proper orientation. Secondary assembly component hole 202 extends from one surface of the component to another surface of the component. One or more stop rib 204, 206 and one or more lock rib 208, 210 and are provided on the surface of secondary assembly component 200 confronting main head 102 in the subassembly. Two such stop ribs 204, 206 and two such lock ribs 208, 210 are shown in the exemplary embodiment illustrated in the drawings. Secondary assembly component 200 receives quarter turn fastener 100 in a subassembly for later connection to primary assembly component 300.

Primary assembly component 300 is provided with an appropriately sized primary assembly component hole 302, also generally rectangular in shape so as to receive fastener 100 only in a proper orientation. Secondary assembly component hole 202 and primary assembly component hole 302 are sized, configured and located so as to receive quarter turn fastener 100 for connecting secondary assembly component 200 with primary assembly component 300.

Quarter turn fastener 100 is installed by hand into secondary assembly component 200 by grasping turn tab 104 and aligning main body legs 170, 180 within secondary assembly component hole 202. Quarter turn fastener 100 is pushed through hole 202, such that flexible head 112 is confronted and deflected by the outer surface of secondary assemble component 200. As quarter turn fastener 100 is forced into secondary assembly component 200, part in assembly legs 150, 160 are deflected progressively inwardly into window 122 as angled sides 152, 162 engage against and slide along edges defining secondary assembly component hole 202. A snapping sound is heard as angled sides 152, 162 pass completely through hole 202, and part in assembly legs 150, 160 rebound outwardly, causing stop surfaces 156, 166 thereof to strike against the edges defining secondary assembly component hole 202. The snapping sound provides an audible signal to an installer that quarter turn fastener 100 has been properly installed into secondary assembly component 200. The part in assembly retaining legs 150, 160 are now engaged securely with the secondary assembly component 200, with ledges 154, 164 on one side of secondary assembly component 200, and flexible head 112 engaged with the secondary assembly component 200 on an opposite side from ledges 154, 164.

To complete an assembly of secondary assembly component 200 to primary assembly component 300, main body legs 170, 180 are aligned with and pushed through primary assembly component hole 302. Turn tab 104 is rotated 90 degrees clockwise until lock arms 106, 108 are first deflect inwardly and then snap outwardly as lock arms 106, 108 rotate past lock ribs 208, 210. The engagement of blunt distal end bodies 118, 120 of lock arms 106, 108 against lock ribs 208, 210 prevents quarter turn fastener 100 from turning counter clockwise prematurely in assembly.

Figure 14:
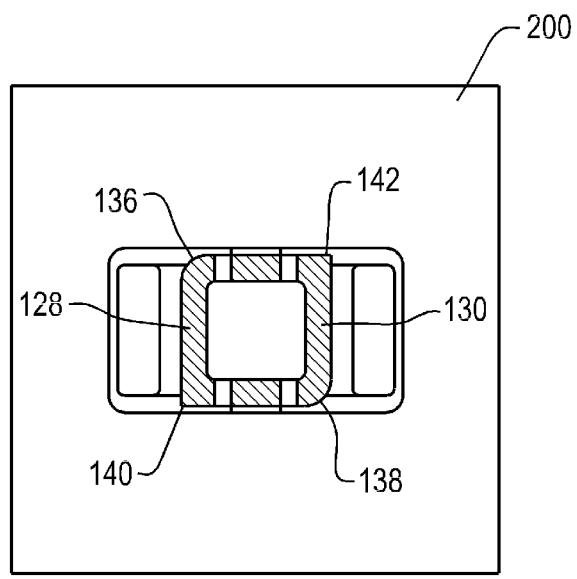
FIG. 14 is a cross-sectional view of the subassembly.

A further rotation stop is built into the main body structure of pedestal 110 that is formed by anti-rotation edges 140, 142 located in opposing corners of the aligned secondary assembly component hole 202 and primary assembly component hole 302. As best illustrated in FIG. 14, anti-rotation corners 140, 142 come into contact with the edge of the components holes 202, 302, preventing further rotation. Radius edges 136, 138 have radiuses allowing the fastener to turn within the component holes 202, 302, clockwise to lock from the unlocked position and counter clockwise to unlock from the locked position. Accordingly, during both installation and removal of the fastener, the structure of the fastener inhibits inadvertent rotation in an improper direction.

During final fastening, as main body legs 170, 180 are rotated clockwise to lock the fastener, the rounded or angular upper edges 174, 184 engage the surface of primary assembly component 300 adjacent primary assembly component hole 302. The primary assembly component slides up the angular surfaces defined by rounded or angular edges 174, 184, with the primary assembly component surface coming to rest on the flat upper surfaces 172, 182 the main body legs 170, 180. As a result, primary assembly component 300 and secondary assembly component 200 are drawn together in a compact assembly. The interaction between main body legs 170, 180 and flexible head 112 keep the joint tight between the two assembly components 200, 300 as flexible head 112 is compressed and acts as a spring.

To unlock fastener 100 when it is necessary to disassemble secondary assembly component 200 and primary assembly component 300 from one another, lock arms 106, 108 are squeezed inwardly, toward turn tab 104, to release distal end bodies 118, 120 from lock ribs 208, 210, while turn tab 104 is rotated 90 degrees counter clockwise. Quarter turn fastener 100 is thereby disconnected from primary assembly component 300, and the subassembly of secondary assembly component 200 together with quarter turn fastener 100 is separable from primary assembly component 300. Quarter turn fastener 100 remains installed in secondary assembly component 200. Thereafter, the assembly can be re-established as described above, connecting the sub-assembly of secondary assembly component 200 and quarter turn fastener 100 to primary assembly component 300.

The invention offers the advantages of a low cost one piece fastener. Assembly tools are not required to install the fastener at a sub supplier, or during final assembly at a main assembly plant. The quarter turn fastener can be installed and tightened by hand with very low ergonomic forces. The fastener is directional, allowing rotation only in the direction for locking when it is unlocked, and only in the direction for unlocking when it is locked, thereby preventing inadvertent improper installation. The quarter turn fastener is configured together with the assembly component holes in which it will be installed so that the installation can occur only in a proper orientation. Rotational stops are provided to inhibit over tightening, thereby reducing instances of potential failure. The fastener can be shipped in a subassembly from an assembly component supplier if desired. The assembly time is reduced because multiple components are eliminated. The fastener can be reused many times.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener for securing first and second components to one another in an assembly, said fastener comprising:
   a main head;
   a deflectable arm having a proximal end connected to said main head, said deflectable arm projecting laterally from said main head to a distal end of said deflectable arm, said deflectable arm and said main head defining a deflection space therebetween into which said distal end and said arm are received upon deflection of said deflectable arm;
   a turn tab projecting outwardly from a surface of said main head, said turn tab configured for manual manipulation when turning the fastener;
   a pedestal projecting from a surface of said main head opposite from said turn tab;
   a first deflectable leg projecting from said pedestal and having a ledge defining a first distance from said main head; and
   a first main body leg projecting from said pedestal and having an upper surface defining a second distance from said main head, said second distance being greater than said first distance.

2. The fastener of claim 1, further including a flexible head at a proximal end of said pedestal, between said main head and said ledge.

3. The fastener of claim 2, said pedestal defining a window therein, said first deflectable leg being positioned on one side of said pedestal and aligned with said window.

4. The fastener of claim 3, including a second deflectable leg projecting from a side of said pedestal opposite said first deflectable leg, said second deflectable leg being aligned with said window on an opposite side of said pedestal from said first deflectable leg.

5. The fastener of claim 3, including a second main body leg projecting from said pedestal opposite said first main body leg, said second main body leg also having an upper surface.

6. The fastener of claim 5, including a second deflectable leg projecting from a side of said pedestal opposite said first deflectable leg, said second deflectable leg being aligned with said window on an opposite side of said pedestal from said first deflectable leg.

7. The fastener of claim 6, said pedestal having at least one radius edge and one non radius edge.

8. The fastener of claim 6 including progressive surfaces leading into said upper surfaces of said main body legs in a rotational direction for fastening.

9. The fastener of claim 6, said first and second deflectable legs having angled sides leading to said ledges thereof.

10. The fastener of claim 6, including first and a second deflectable arm connected to and projecting laterally from said main head.

11. The fastener of claim 1, said pedestal having radius edges in diagonally opposite corners.

12. The fastener of claim 1, including a second deflectable arm connected to and projecting laterally from said main head.

13. A fastener subassembly, comprising:
a fastener having:
  a main head;
  a deflectable arm having a proximal end connected to said main head, said deflectable arm projecting laterally from said main head to a distal end of said deflectable arm, said deflectable arm and said main head defining a deflection space therebetween into which said distal end and said arm are received upon deflection of said deflectable arm;
  a turn tab projecting outwardly from a surface of said main head, said turn tab configured for manual manipulation when turning the fastener;
  a pedestal projecting from a surface of said head opposite from of said turn tab;
  a first deflectable leg projecting from said pedestal and having a ledge defining a first distance from said main head;
  a flexible head at a proximal end of said pedestal, between said main head and said ledge; and
  a first main body leg projecting from said pedestal and having an upper surface defining a second distance from said head, said second distance being greater than said first distance; and
an assembly component defining an assembly component hole extending from an outer surface thereof to an other surface thereof, said outer surface of said assembly component including a lock rib in the path of said deflectable arm upon rotation of said fastener in said hole, said pedestal extending through said hole, said flexible head engaging said outer surface adjacent said hole, and said ledge engaging said other surface adjacent said hole.

14. The fastener subassembly of claim 13, said turn tab extending beyond said main head, and said outer surface of said assembly component including a stop rib limiting rotation of said fastener in said hole by confronting said turn tab outwardly of said main head.

15. The fastener subassembly of claim 13, said turn tab extending beyond said main head at each end of said turn tab, and said outer surface of said assembly component including first and second stop ribs limiting rotation of said fastener in said hole by confronting each end of said turn tab outwardly of said main head.

16. The fastener subassembly of claim 13, including a second deflectable arm connected to and projecting laterally from said main head; and said outer surface of said assembly component including a second lock rib in the path of said second deflectable arm upon rotation of said fastener in said hole.

17. The fastener subassembly of claim 16, said turn tab extending beyond said main head at each end of said turn tab, and said outer surface of said assembly component including first and second stop ribs limiting rotation of said fastener in said hole by confronting each end of said turn tab outwardly of said main head.

18. The fastener subassembly of claim 13, said pedestal having radius edges in diagonally opposite corners.

* * * * *